(No Model.)

B. F. LARE & C. M. GREER.
TROLLEY.

No. 528,949. Patented Nov. 13, 1894.

Witnesses:
Wm M. Scott
Fredk J. Lambert

Inventors.
Benjamin F. Lare
Charles M. Greer
by Thomas D. Moulds
their Attorney.

UNITED STATES PATENT OFFICE.

BENJAMIN F. LARE AND CHARLES M. GREER, OF PHILADELPHIA, PENNSYLVANIA, ASSIGNORS TO THE AJAX METAL COMPANY, OF SAME PLACE.

TROLLEY.

SPECIFICATION forming part of Letters Patent No. 528,949, dated November 13, 1894.

Application filed May 1, 1894. Serial No. 509,708. (No model.)

*To all whom it may concern:*

Be it known that we, BENJAMIN F. LARE and CHARLES M. GREER, citizens of the United States, residing at Philadelphia, in the county of Philadelphia and State of Pennsylvania, have invented certain new and useful Improvements in Trolley-Wheel Forks; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to trolley wheel forks used on electric railways and the object of our improvement is twofold, first to construct a trolley wheel fork that will present an unobstructed surface from top to base and have no extending projection to catch upon and pull down the line or fixtures, should the trolley wheel slip off of the current conveying wire; second, to prevent the outer rim or edge of the trolley wheel from rubbing against and wearing away the contact springs that are placed on each side of the wheel.

To accomplish the desired results we construct the trolley fork in the manner hereinafter described and shown in the accompanying drawings, in which—

Figure 1:
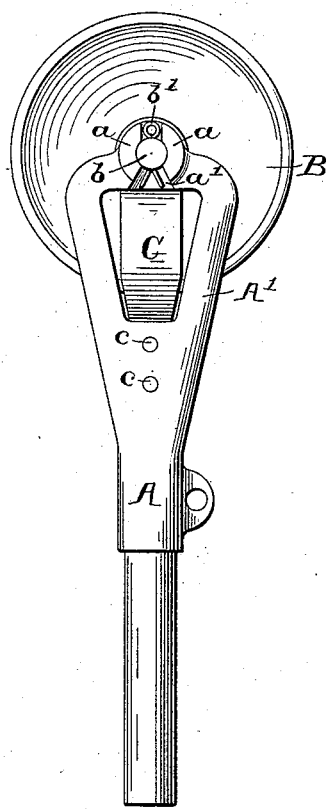
Figure 2:
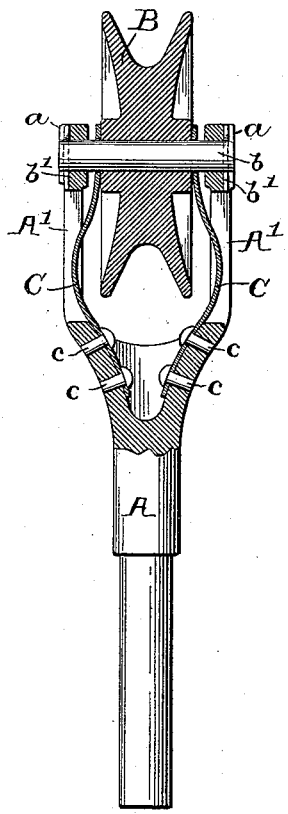
Figure 3:
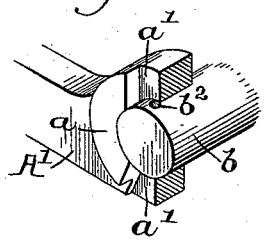

Figure 1, is a side view of our improved trolley fork with the wheel mounted therein. Fig. 2, is a vertical sectional view of the fork and wheel. Fig. 3, is a sectional perspective view showing part of the fork and shaft upon which the trolley wheel is mounted.

A, represents the base of the fork which is secured upon the end of the trolley pole by any convenient means.

A', A', are the two upwardly extending prongs of the fork, one on each side of the wheel.

$a, a$, are bosses formed on the outside of the top parts of the prongs A'.

$b$, is the trolley wheel shaft extending through circular holes drilled in the bosses $a, a$.

B, is the trolley wheel supported by and revolving upon the shaft $b$.

$a', a'$ are vertical slots cut through the bosses $a, a$. These slots are cut wide at the bottom to allow the spring pins or keys $b', b'$, to be spread or bent outwardly after they have been inserted through the holes $b^2$, in the shaft $b$.

C, C, are two upwardly extending contact springs secured to the base of the fork by means of the rivets $c, c$. The free ends of these contact springs rest against the sides of the trolley wheel B, and the middle portions thereof are bent outwardly as shown in Fig. 2 of the drawings. To allow the springs to take this shape the middle parts of the prongs A', A', are cut away in the manner shown in Fig. 1, or if desired these portions of the prongs A', A', may be made thinner or cast with a slight bend or bulge that will correspond with the bend in the contact springs C.

When all of the parts of the device are new and fitting snugly together, the outer rim of the trolley wheel B, will never come in contact with the springs C, but after being in use some time the hole in the trolley wheel becomes larger and the shaft $b$, is worn thinner. Consequently the wheel B, will wabble considerably, and when the car is turning a corner the outer edge or rim of the wheel will be forced against one or the other of the springs C, and soon cut them through, unless said springs are bent back out of the way in the manner herein shown.

Instead of the bosses $a, a$, formed on the top of the prongs A', A', this portion of the fork may be cast heavy enough to allow the slots $a'$, to be cut therein without weakening the fork too much. The ends of the shaft $b$, that carries the wheel B, are flush with the outer surface of the bosses $a, a$, and the spring pins or keys $b'$, some distance in. Consequently when the wire slips off of the wheel B, and drops down along the trolley fork there is nothing for it to catch upon and no damage is done.

Having thus described our invention, what we claim as new is—

1. A trolley wheel fork composed of the base A, and the two upwardly projecting arms of prongs A', A', said arms or prongs, having suitable holes drilled therein for the insertion of the trolley wheel shaft and on opposite sides of the said holes, the slots or depressions $a'$, substantially as and for the purpose described.

2. A trolley wheel fork composed of the base A, and prongs A', A', having therein the slots $a$, in combination with a trolley wheel B, and the shaft $b$, the ends of said shaft being made flush with the outer surface of that part of the fork through which it is inserted, substantially as shown.

3. In a trolley wheel fork composed of the base A, prongs A', A', having therein the slots $a'$, $a'$, and provided with the contact springs C, C, bent back into a depression or cut away portion in the prongs A', A', in combination with the trolley wheel B, revolving on a shaft $b$, the ends of which are flush with the sides of the prongs and held in position by a key or pin passing through the slots in the prongs A', substantially as shown.

In testimony whereof we affix our signatures in presence of two witnesses.

BENJAMIN F. LARE.
CHARLES M. GREER.

Witnesses:
CHAS. H. WHITE,
THOS. D. MOWLDS.